June 11, 1929.  E. B. NATHAN  1,716,830
WINTER OR WEATHER CLOSURE FOR AUTOMOBILES
Filed May 6, 1925  3 Sheets-Sheet 3
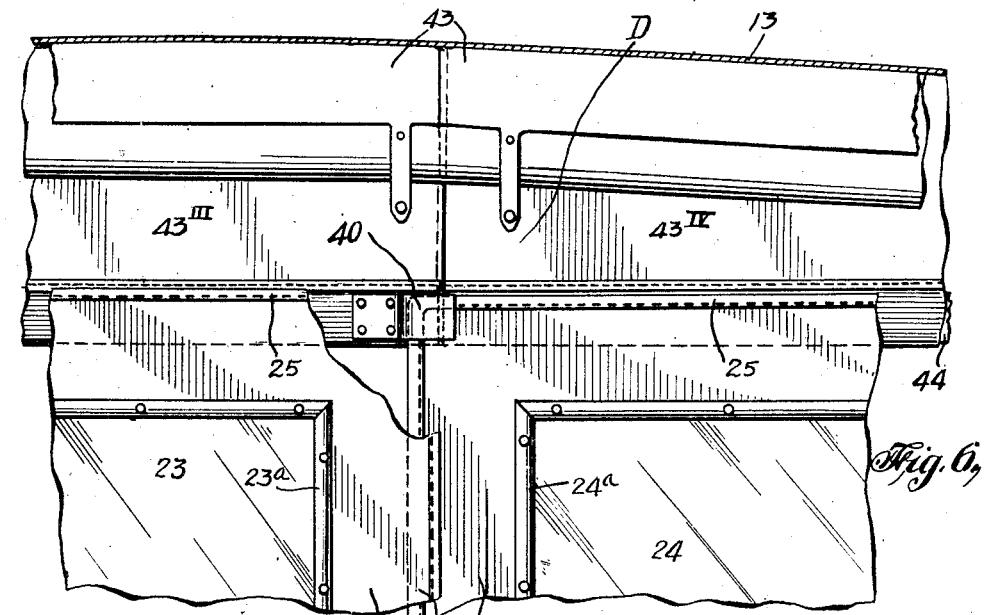
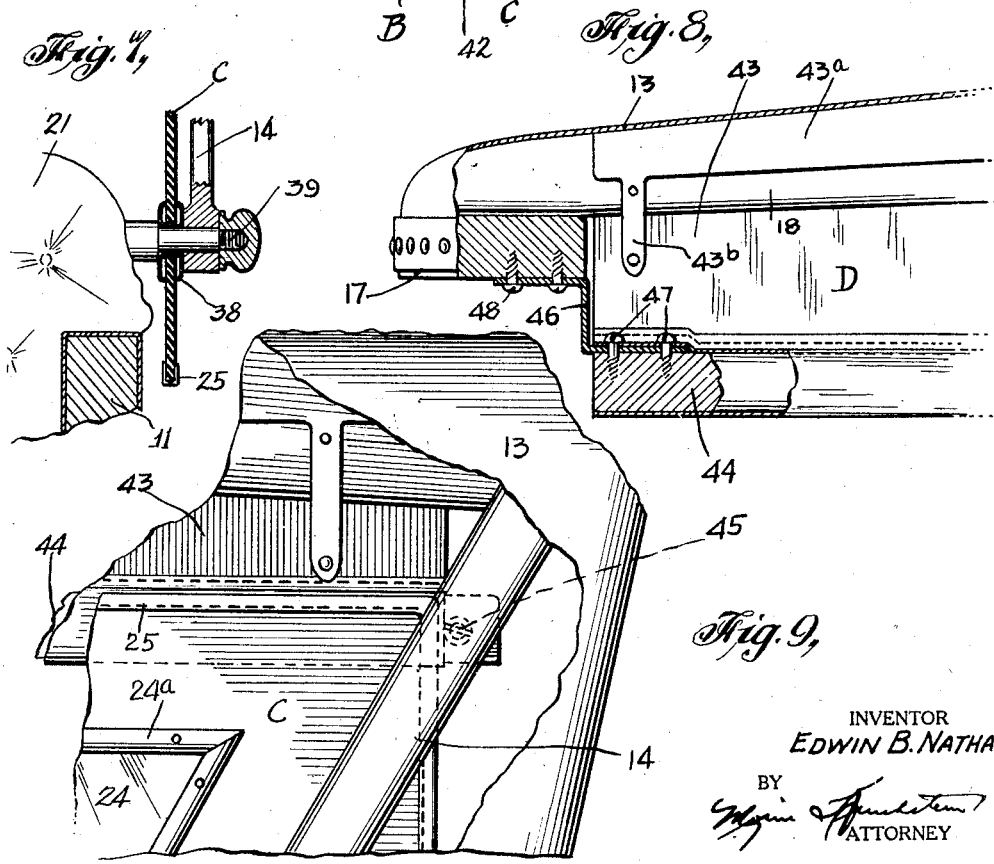
INVENTOR
EDWIN B. NATHAN
BY
ATTORNEY Patented June 11, 1929.

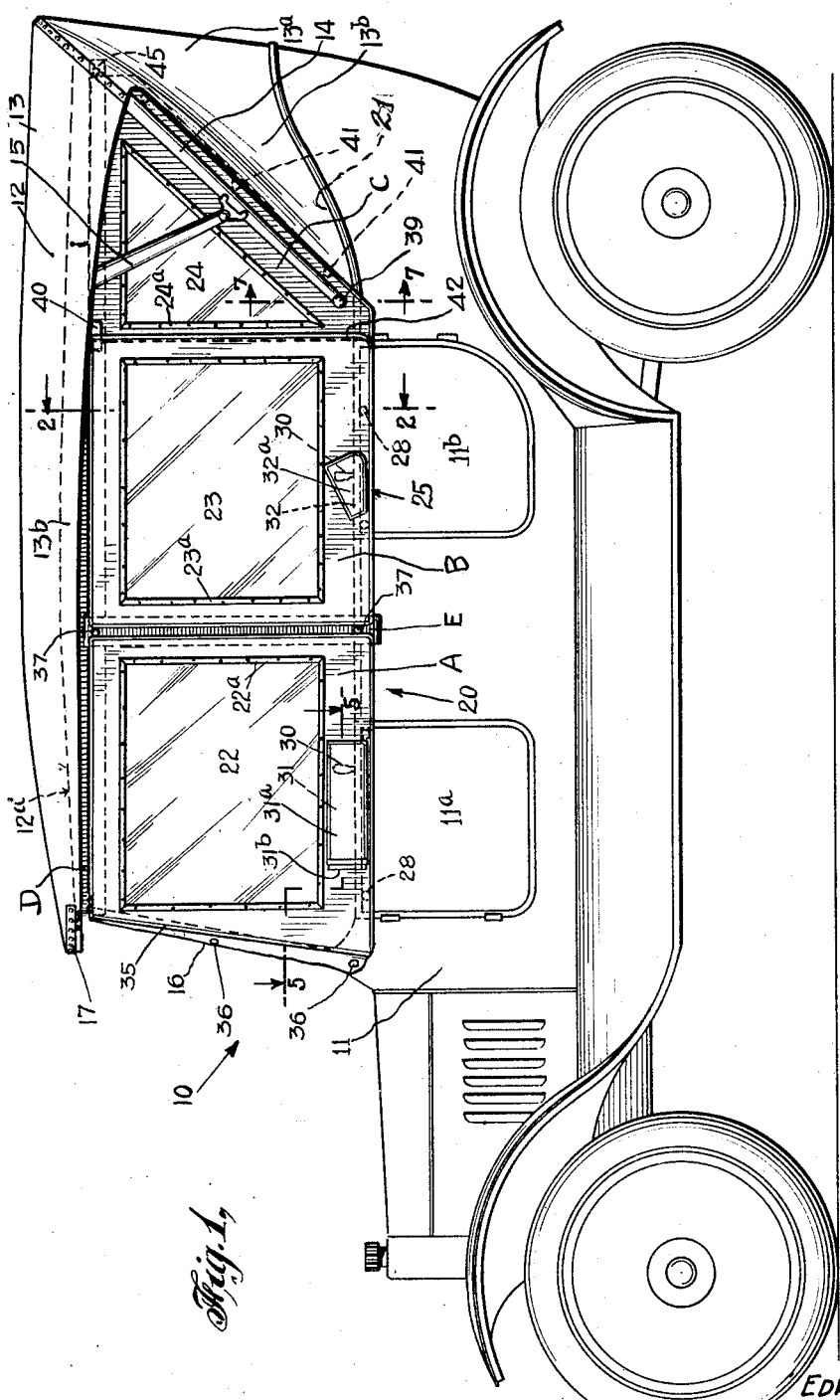

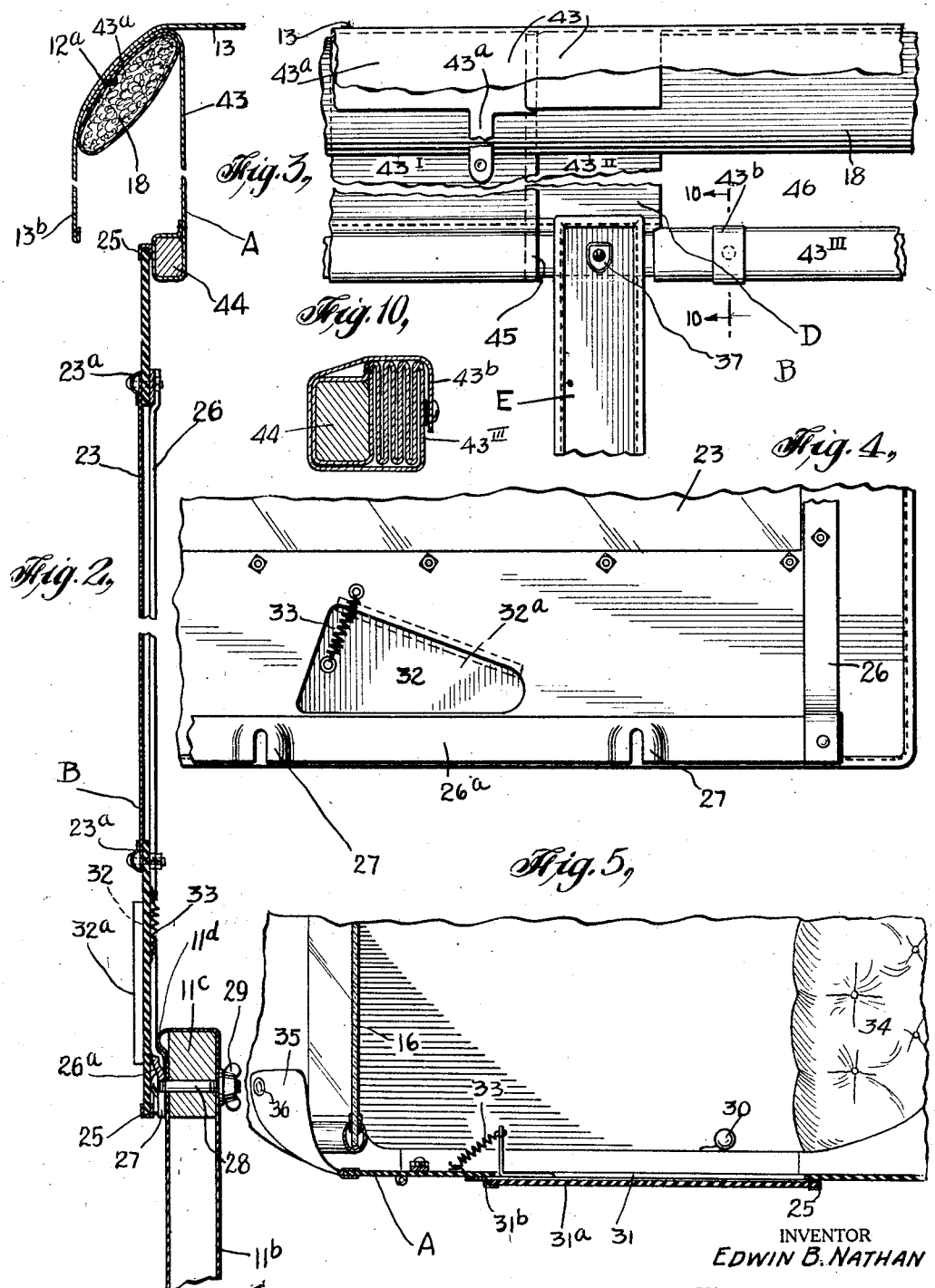

1,716,830

UNITED STATES PATENT OFFICE.

EDWIN B. NATHAN, OF YONKERS, NEW YORK.

WINTER OR WEATHER CLOSURE FOR AUTOMOBILES.

Application filed May 6, 1925. Serial No. 28,306.

This invention relates to weather or winter closures for automobile touring cars.

An object of the invention is to provide an improved detachable weather or winter closure which may quickly and easily be mounted in position on a standard touring car body, is constructed so as not to interfere with the convenience of the passenger's entrance and exit from the car, and includes novel means to permit ventilating the interior of the car.

Another object of the invention is to provide an improved weather or winter closure comprising few and simple parts forming a sectional structure which is simple to install, cheap to manufacture, neat in appearance, and efficient and practical to a high degree.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention, Fig. 1 is a side-elevational view of a touring car with a winter closure embodying the invention applied thereto;

Fig. 2 is a cross-sectional view taken on line 2—2 in Fig. 1 showing the means for mounting the middle closure panel section;

Fig. 3 is a fragmentary detailed view showing the construction of the ventilating means;

Fig. 4 is a fragmentary detail view of the interior side of the closure panel sections;

Fig. 5 is a cross-sectional view taken on line 5—5 in Fig. 1 through the closure panel section adjacent the operator's seat;

Fig. 6 is a fragmentary detail view, partly broken away, showing the assembly of portions of the upper, rear and middle closure panel sections;

Fig. 7 is a fragmentary cross-sectional view taken on line 7—7 in Fig. 1;

Fig. 8 is a fragmentary detail view, partly broken away, showing the front supporting means of the upper closure section;

Fig. 9 is a fragmentary detail view showing the rear supporting means of the upper closure section; and Fig. 10 is a fragmentary cross-sectional view showing the flexible strip on the upper panel section collapsed and secured against the rod for ventilating the interior of the car.

Referring in detail to the drawing, 10 denotes an automobile having a touring car body 11 with front side doors $11^a$, rear side door $11^b$, and a collapsible top 12 of any well known construction. The top 12 is seen to include a fabric top 13 and rear outer covering $13^a$, a rear upwardly and outwardly extending bow stanchion 14, and bracing members 15 pivoted between said stanchion member and the longitudinally extending sides of a horizontally disposed foldable main frame of well known automobile top construction (not shown) said frame terminating at the front side over the wind shield 16 in a bow member 17, the frame structure of said wind shield 16 serving as a support for the front end of the top 12, in the well known manner.

Extending along the long edge portions $12^a$ of the top member 12 on the interior side of the covering 13, suitable shaping means as for example padding members 18 (see Fig. 2) are provided to maintain the curved contour of said portions $12^a$.

To the automobile 10 with the top 12 up and in effective position, a detachable weather or winter closure 20 embodying the invention may be fitted as shown in Fig. 1. Said closure 20 is seen to comprise panel sections A, B, C, D, sections A and B being secured in position to extend up from and to swing with doors $11^a$ and $11^b$ respectively, section C being fastened in position to shield the rear seat 21 and section D extending lengthwise of the under side of the top edge portions $12^a$ inwardly from the drop sides $13^b$ of the outer covering 13. (See Figs. 1 and 2.)

The sections A, B and C may be made of fibre, wood, metal or other suitable stiff sheet material having finished surfaces designed to conform with the car decoration; and when made of fibre may have finished surfaces to simulate grained leather and be provided with a binding 25 for reinforcing the edge portions, thus adding to the neat appearance of the installation. Each of said sections A, B and C may also be provided with windows 22, 23 and 24 respectively, of glass, celluloid, or other transparent material, and may be mounted in any well known manner, as by means of bolted frames $22^a$, $23^a$ and $24^a$ respectively.

To secure panel sections A and B to the doors $11^a$ and $11^b$ respectively, there is provided for each panel a stiffening frame member 26 having suitable detachable fastening means, as, for example, slotted socket portions 27 in the lower horizontally extending sides 26ᵃ of said frame member 26 for engaging with the head of a carriage bolt 28. Said bolts are preferably passed through the inner frame structure 11ᶜ of the said doors below the ornamental beading 11ᵈ (see Fig. 2) and are provided with wing nuts 29 to facilitate the quick installation and detachment of said sections. The frame members 26 are preferably constructed to extend about the edge portions of said sections to serve as a brace so that said sections form a rigid structure when assembled in position.

In the portions of sections A and B adjacent the usual lock levers 30 on the doors 11ᵃ and 11ᵇ, hand holes 31 and 32 and closure members 31ᵃ and 32ᵃ respectively are provided to permit manipulation of said levers from the exterior side of the car, said members being normally held shut by a suitable spring 33.

If desired, the member 31ᵃ adjacent the driver's seat 34 may be made to serve as a stop signalling device by shaping said member relatively wide, providing it with a vertically extending hinge 31ᵇ so that the said member when opened extends out a substantial distance, and applying a semaphore legend or other suitable traffic signal device (not shown) on the interior side of the free end portion of said member 31ᵃ.

The front vertically extending edge portions 35 of panel sections A are preferably made of flexible material, such as oil cloth, "leatherette", or the like material, to provide a foldable extension for positively closing the spaces between said section and the wind shield 16. Suitable quick detachable securing means such as spaced snap fasteners 36 on the body 11 and the uprights of said wind shield are provided for securing said portions 35 in effective position, as shown in Figs. 1 and 5.

Between the sections A and B vertically extending strip E may be mounted by means of a pair of snap fasteners 37, one fastener being secured to the upper section D and the other to the body portion 11 (see Figs. 1 and 3) said strip E serving as a closure for the space between said sections A and B. If desired, section E may be omitted and its purpose served by bringing sections A and B together to abut each.

The panel sections C may be shaped to correspond with the openings between the side extension portions 13ᵇ of the rear outer covering 13ᵃ and section B. The rear side edges of sections C may be shaped substantially triangularly as shown in Fig. 1, and have eyelet perforations 38 in their lower edge portions for receiving the supporting stud bolts 39 on which the bow stanchion 14 is mounted (see Fig. 7). The upper front corner of sections C may be secured by a clip 40 to overlie sections D as shown in Figs. 1 and 6, and the rear edge portions of the sections C are preferably provided with snap fastener members 41 for engaging with the co-operating members (not shown) usually provided on the adjacent edge of the extension portions 13ᵇ for engaging with the curtains supplied with the standard car equipment. When the sections B and C are in normally closed position, section B is preferably constructed to overlap section C as shown at 42 in Figs. 1 and 6.

The upper panel sections D preferably comprise flexible strips of material 43 similar to that forming the edge portions 35 on section A and have one of their longitudinal edges suitably secured to a rod 44 as by folding about the latter as shown in Fig. 2. Each rod 44 is secured in a horizontally disposed position and has its rear end fastened to the bow stanchion 14 by suitable means as by screw 45, the front ends of said rods being provided with spacing bracket arms 46 for suspending said rods from the front bow member 17, see Figs. 1, 8 and 9. The bracket arm 46 may be secured to the rods 44 and said bow member 17 by screws 47 and 48 respectively. The flexible strips of material 43 of the section D is normally held in position to close the spaces over the rods 44 and below the under side of the top 12 by inserting the free longitudinal edge portions 43ᵃ between the padding members 18 and the top covering 13 as seen from Figs. 2, 3 and 6. The said portions 43ᵃ will be held against accidental displacement due to the frictional engagement and clamping thereof between said members 18 and the covering 13. If desired, positive securing means such as pins and the like may be employed for this purpose. To facilitate the insertion of said portions 43ᵃ, tabs 43ᵇ may be provided to extend therefrom.

The flexible strips 43 of each section D may be made of a single strip but preferably are constructed to form parts 43ᴵ, 43ᴵᴵ, 43ᴵᴵᴵ, and 43ᴵⱽ. The adjacent edge portion thereof may be made to overlap as at 45. Said parts 43ᴵ, 43ᴵᴵᴵ, and 43ᴵⱽ are adapted to be rolled or folded up independently of each other so as to leave a ventilating space as shown at 46 in Fig. 3. The tabs 43ᵇ serve as holding bands for the said parts when so rolled or folded up.

In using the invention, the snap fastening members 36 and 37 and the sections D are mounted in position on the car, the sections C and E fitted in place, the sections A and B secured to the doors 11ᵃ and 11ᵇ by suitable clamping means as by the bolts 28 and the flexible edge portions 35 of section A folded around the wind shield 16 to engage with said fastener 36.

The installation of the winter or weather closure is thus completed and may be accomplished by anyone with the aid of a few simple tools since the construction is exceedingly simple and requires no special mechanical skill in fitting it to an automobile.

To ventilate the interior of the car with the winter or weather closure in position, one or more parts $43^I$, $43^{III}$ and $43^{IV}$ are simply rolled up as shown in Fig. 3.

To dismount the winter closure, the panel sections A, B, C, D and E may be easily detached from their fastening on the car, as will readily be understood.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. In combination, a touring car body including a top and panel sections demountably secured to said body to form a closure of the character described, at least one of said sections being swingably mounted with respect to the body, and means independent of said swingable sections, foldable to permit ventilation of the interior of the car.

2. In combination, a touring car body having a top and a sectional structure detachably mounted on said body to form a closure of the character described, said structure having supporting sections, and a panel swingably mounted on said body with respect to the supporting sections, and flexible portions incorporated in said structure and collapsible independent of said panel to permit ventilating the interior of the car.

3. In combination, a touring car body having a top, a bracing means extending longitudinally of the edge portions of said top, and a sectional structure detachably mounted on said body to form a closure of the character described, one section of said structure extending along said means, said section including a flexible portion, the longitudinal edge of said portion being adapted to be inserted between said top and the bracing means, said flexible portion constructed of independent parts adapted to be collapsed to form a ventilating means.

4. In combination, a touring car body including a top, doors for said body, panel sections demountably secured to said body to form a closure of the character described, each door supporting a section to move therewith, one of said sections extending in a relatively fixed position longitudinally of and adjacent said top to form an abutment for the door sections, said fixed section having adjustable means to permit ventilating the interior of the car, said means comprising a plurality of sections of flexible, collapsible material, and means for retaining said material in collapsed condition.

5. A weather or winter closure for a vehicle having a top, demountable panel sections adapted to be secured to the vehicle body, and including a section extending lengthwise of said top, said section comprising a substantially stiff rod secured to the top structure and serving as an abutment for the panel sections, and flexible material closing the space between said rod and the top releasably engaged and retained by said top.

6. A weather or winter closure for a vehicle having a top comprising demountable panel sections adapted to be secured to the vehicle body, and an elongated section extending lengthwise of said top for cooperating with said panel sections to form a wall of the closure, said elongated section being formed of parts releasably engaging the top structure and adapted to be collapsed for ventilating purposes.

In testimony whereof I affix my signature.

EDWIN B. NATHAN.